(12) United States Patent
Abe et al.

(10) Patent No.: US 9,624,319 B2
(45) Date of Patent: Apr. 18, 2017

(54) TERMINAL GROUP CONVERSION METHOD AND TERMINAL STABILIZING METHOD

(71) Applicant: ASAHI GLASS COMPANY, LIMITED, Tokyo (JP)

(72) Inventors: Takefumi Abe, Tokyo (JP); Akihiko Asakawa, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 14/848,639

(22) Filed: Sep. 9, 2015

(65) Prior Publication Data

US 2015/0376302 A1    Dec. 31, 2015

Related U.S. Application Data

(63) Continuation of application No. PCT/JP2014/057864, filed on Mar. 20, 2014.

(30) Foreign Application Priority Data

Mar. 27, 2013 (JP) ................................ 2013-066015

(51) Int. Cl.
| | |
|---|---|
| *C08F 8/06* | (2006.01) |
| *C08F 114/18* | (2006.01) |
| *C08F 8/24* | (2006.01) |
| *C08F 8/22* | (2006.01) |

(52) U.S. Cl.
CPC ................. *C08F 8/06* (2013.01); *C08F 8/22* (2013.01); *C08F 8/24* (2013.01); *C08F 114/185* (2013.01); *C08F 2810/40* (2013.01)

(58) Field of Classification Search
CPC .......... C08F 14/18; C08F 14/20; C08F 14/22; C08F 14/24; C08F 14/26; C08F 14/28; C08F 2810/40; C08F 8/06
See application file for complete search history.

(56) References Cited

U.S. PATENT DOCUMENTS

| | | | |
|---|---|---|---|
| 6,111,062 A | 8/2000 | Shirota et al. | |
| 6,451,962 B1 * | 9/2002 | Hiraga | ........................ C08J 3/00 528/480 |
| 2007/0112155 A1 | 5/2007 | Takase et al. | |
| 2012/0016089 A1 | 1/2012 | Takase et al. | |
| 2013/0303701 A1 * | 11/2013 | Brothers | ................ C08L 29/10 525/200 |
| 2013/0303715 A1 * | 11/2013 | Brothers | ............. C08F 214/262 526/255 |

FOREIGN PATENT DOCUMENTS

| | | |
|---|---|---|
| JP | 6-279537 | 10/1994 |
| JP | 11-152310 | 6/1999 |
| JP | 2000-198813 | 7/2000 |
| JP | 2003-313236 | 11/2003 |
| WO | WO 2005/049661 | 6/2005 |

OTHER PUBLICATIONS

International Search Report issued Apr. 15, 2014 in PCT/JP2014/057864 filed Mar. 20, 2014.

\* cited by examiner

*Primary Examiner* — Robert C Boyle
(74) *Attorney, Agent, or Firm* — Oblon, McClelland, Maier & Nesutadt, L.L.P.

(57) ABSTRACT

To provide a terminal group conversion method and a terminal stabilizing method, which are capable of converting unstable terminal groups in a fluorinated polymer to carboxylic acid fluoride groups at a high conversion rate. A fluorinated polymer is heated at from 200 to 400° C. for at least one hour in the presence of at least 50 mol of molecular oxygen per 1 mol of unstable terminal groups in the fluorinated polymer, to convert from 50 to 100 mol % of the unstable terminal groups to carboxylic acid fluoride groups.

8 Claims, 1 Drawing Sheet

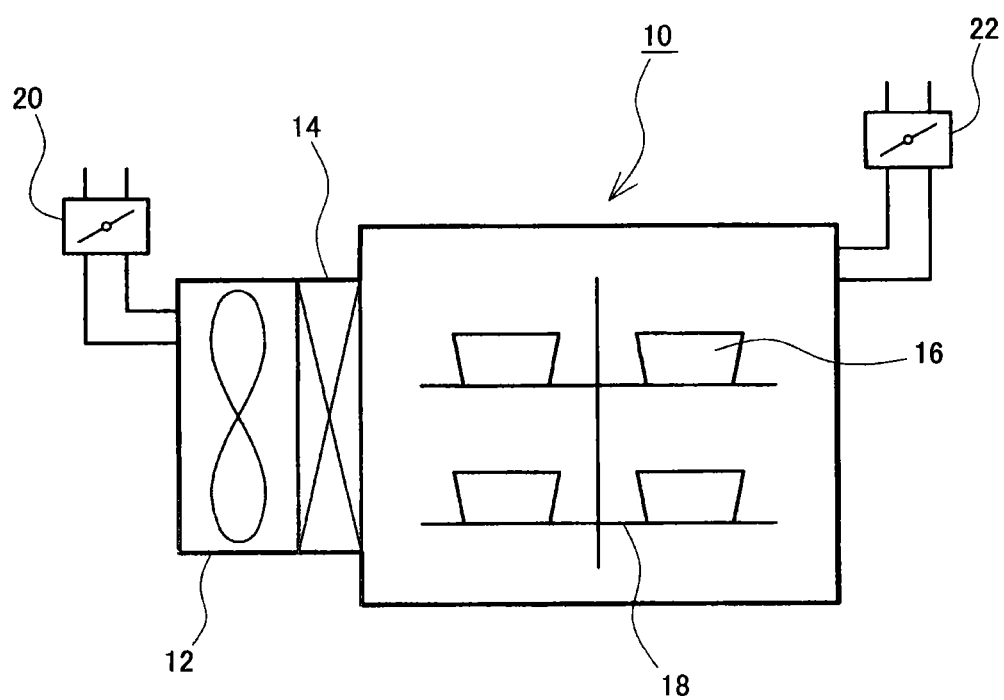

TERMINAL GROUP CONVERSION METHOD AND TERMINAL STABILIZING METHOD

TECHNICAL FIELD

The present invention relates to a terminal group conversion method and a terminal stabilizing method.

BACKGROUND ART

Heretofore, a fluorinated polymer excellent in heat resistance, chemical resistance, etc. has been used in various applications. In a fluorinated polymer, unstable terminal groups having a polymerization initiator, chain transfer agent, etc. bonded at terminals of the polymer, are present, whereby due to decomposition of such unstable terminal groups, the apparatus is likely to be corroded, or the fluorinated polymer itself is likely to be colored, at the time of molding the fluorinated polymer or during its use at a high temperature. As it contains such unstable terminal groups, the fluorinated polymer is likely to lose the ultraviolet light resistance, chemical resistance, optical properties, etc. which are otherwise intrinsic to the fluorinated polymer.

In order to solve such problems, a method is known to fluorinate a fluorinated polymer obtained by polymerization, in the presence of fluorine gas, to convert unstable terminal groups to perfluoromethyl groups ($-CF_3$) (Patent Document 1).

PRIOR ART DOCUMENT

Patent Document

Patent Document 1: JP-A-2003-313236

DISCLOSURE OF INVENTION

Technical Problem

In recent years, particularly high ultraviolet light resistance, chemical resistance and optical properties have been required for applications to e.g. optical waveguide material, wire coating material, an ink repellent (e.g. for coating, or a printing machine such as an ink jet), an oil repellent (e.g. oil-preventive coating of a filter, or a high performance oil repellent such as an oil-leakage preventing agent for a fluid dynamic bearing motor), lens material, an adhesive for a semiconductor element (e.g. LOC (Lead on Chip), an adhesive for a tape, an adhesive for die bonding, or an adhesive for fixing a pellicle), a protective coating for a semiconductor (e.g. a buffer coating film, a passivation film, a semiconductor element α-ray shielding film, or a moisture-proof coating agent), an interlayer dielectric film (e.g. for a semiconductor element, for a liquid crystal display, or for a multilayer printed circuit board), an optical thin film, etc. According to the present inventors, in the method disclosed in Patent Document 1, there has been a case where the conversion from unstable terminal groups to perfluoromethyl groups is inadequate, and, as such, cannot be used for the above applications.

It is an object of the present invention to provide a terminal group conversion method whereby unstable terminal groups in a fluorinated polymer are converted to carboxylic acid fluoride groups at a high conversion rate. Further, it is an object of the present invention to provide a terminal stabilizing method whereby unstable terminal groups in a fluorinated polymer are converted to carboxylic acid fluoride groups at a high conversion rate, and the carboxylic acid fluoride groups are then fluorinated.

Solution to Problem

The present invention provides a terminal group conversion method and a terminal stabilizing method having the following constructions [1] to [7].

[1] A terminal group conversion method which comprises heating a fluorinated polymer at from 200 to 400° C. for at least one hour in the presence of at least 50 mol of molecular oxygen per 1 mol of unstable terminal groups in the fluorinated polymer, to convert from 50 to 100 mol % of the unstable terminal groups to carboxylic acid fluoride groups.

[2] The terminal group conversion method according to [1], wherein the molecular oxygen is supplied at a rate of from 5 to 300 mol/hr to 1 mol of the unstable terminal groups.

[3] The terminal group conversion method according to [1] or [2], wherein the unstable terminal groups are groups derived from at least one member selected from the group consisting of a polymerization initiator, a chain transfer agent and a dispersion stabilizer which are used at the time of producing the fluorinated polymer by polymerizing a monomer.

[4] The terminal group conversion method according to any one of [1] to [3], wherein the fluorinated polymer is a fluorinated polymer having an aliphatic ring in its main chain.

[5] The terminal group conversion method according to any one of [1] to [4], wherein the fluorinated polymer is a perfluoro-fluorinated polymer.

[6] A terminal stabilizing method for a fluorinated polymer, which comprises converting from 50 to 100 mol % of unstable terminal groups in the fluorinated polymer to carboxylic acid fluoride groups by the method as defined in any one of [1] to [5], and then reacting molecular fluorine to convert the carboxylic acid fluoride groups to perfluoromethyl groups.

[7] The terminal stabilizing method for a fluorinated polymer according to [6], wherein fluorine gas is dissolved and reacted in a solution of the fluorinated polymer having the carboxylic acid fluoride groups.

Advantageous Effects of Invention

The terminal group conversion method and the terminal stabilizing method of the present invention are capable of converting unstable terminal groups in a fluorinated polymer to carboxylic acid fluoride groups at a high conversion rate.

The terminal stabilizing method for a fluorinated polymer of the present invention is capable of converting unstable terminal groups in the fluorinated polymer to perfluoromethyl groups at a high conversion rate.

BRIEF DESCRIPTION OF DRAWING

The FIGURE is a view illustrating an example of the heating furnace to be used for heating.

DESCRIPTION OF EMBODIMENTS

In this specification, a "fluorinated polymer" is a polymer having fluorine atoms in its structure. Fluorine atoms may be bonded to carbon atoms constituting a main chain, or may be bonded to a side chain.

"Units" means repeating portions constituting a polymer, derived from a monomer.

In this specification, a compound represented by the formula (1) may be referred to also as a "compound (1)". Units, compounds, etc., represented by other formulae may be referred to in the same manner, and for example, a unit represented by the formula (3-1) may be referred to also as a "unit (3-1)".

In the terminal group conversion method of the present invention, a fluorinated polymer is heated at from 200 to 400° C. for at least one hour in the presence of at least 50 mol of molecular oxygen per 1 mol of unstable terminal groups in the fluorinated polymer, to convert from 50 to 100 mol % of the unstable terminal groups to carboxylic acid fluoride groups.

As mentioned above, as a method for stabilizing unstable terminal groups in a fluorinated polymer, a method is known to fluorinate the fluorinated polymer obtained by polymerization, in the presence of fluorine gas. As described later, unstable terminal groups are groups derived from a polymerization initiator, a chain transfer agent, a dispersion stabilizer, etc. and have various structures, and therefore, it has been difficult to convert all unstable terminal groups to stable perfluoromethyl groups. In the present invention, firstly a fluorinated polymer obtained by polymerization is heated to covert unstable terminal groups to carboxylic acid fluoride groups at a high conversion rate. As the heating conditions, the above fluorinated polymer is heated at from 200 to 400° C. for at least one hour, in the presence of at least 50 mol of molecular oxygen per 1 mol of unstable terminal groups, whereby the unstable terminal groups can be converted to carboxylic acid fluoride groups at a high conversion rate. Then, the carboxylic acid fluoride groups are fluorinated and can thereby be converted to perfluoromethyl groups at a high conversion rate. Thus, it has been found it possible to thereby efficiently carry out stabilization of unstable terminal groups of the fluorinated polymer.

[Fluorinated Polymer]

The fluorinated polymer in the present invention may, for example, be a tetrafluoroethylene/fluoro(alkyl vinyl ether) copolymer (referred to also as "PFA"), a tetrafluoroethylene/hexafluoropropylene copolymer (referred to also as "FEP"), a tetrafluoroethylene/fluoro(alkyl vinyl ether)/hexafluoropropylene copolymer (referred to also as "EPA"), an ethylene/tetrafluoroethylene copolymer (referred to also as "ETFE"), a polyvinylidene fluoride (referred to also as "PVDF"), a polyvinyl fluoride (referred to also as "PVF"), a polychlorotrifluoroethylene (referred to also as "PCTFE"), an ethylene/chlorotrifluoroethylene (referred to also as "ECTFE"), or a fluorinated polymer having an aliphatic ring in its main chain. Such a fluorinated polymer is preferably a fluorinated polymer containing substantially no hydrogen atoms bonded to carbon atoms, except for its terminal groups (hereinafter referred to also as a "perfluoro-fluorinated polymer").

Further, the fluorinated polymer of the present invention is preferably a fluorinated polymer having an aliphatic ring in its main chain, particularly preferably a perfluoro-fluorinated polymer having an aliphatic ring in its main chain. The perfluoro-fluorinated polymer having an aliphatic ring in its main chain is a fluorinated polymer having a high amorphous nature and high optical transparency.

In the "fluorinated polymer having an aliphatic ring in its main chain", "having an aliphatic ring in its main chain" means that at least one of carbon atoms constituting the ring structure of the aliphatic ring is a carbon atom constituting the main chain of the fluorinated polymer.

For example, in a case where the fluorinated polymer is one obtained by polymerization of a monomer having a polymerizable double bond, at least one of carbon atoms derived from the polymerizable double bond of the monomer used for the polymerization becomes a carbon atom constituting the main chain. For example, in a case where the fluorinated polymer is a polymer obtained by polymerizing a cyclic monomer as described hereinafter, two carbon atoms constituting the polymerizable double bond of the cyclic monomer become carbon atoms constituting the main chain. Further, in the case of a fluorinated polymer obtained by ring-opening polymerization of a monomer having two polymerizable double bonds, at least two among four carbon atoms constituting the two polymerizable double bonds become carbon atoms constituting the main chain.

The "aliphatic ring" represents a ring having no aromatic nature. The aliphatic ring may be saturated or unsaturated. The aliphatic ring may be a carbon ring wherein the ring structure is composed solely of carbon atoms, or a hetero ring which contains an atom (hetero atom) other than carbon atoms in the ring structure.

The number of atoms constituting the ring structure of the aliphatic ring is preferably from 4 to 7, particularly preferably 5 or 6. That is, the aliphatic ring is preferably a 4- to 7-membered ring, particularly preferably a 5- or 6-membered ring.

The aliphatic ring may have a substituent or may not have a substituent. The expression "may have a substituent" means that a substituent (an atom other than a hydrogen atom, or a group) may be bonded to an atom constituting the ring structure of the aliphatic ring.

The aliphatic ring is preferably an aliphatic ring containing fluorine atom(s). The aliphatic ring containing fluorine atom(s) may, for example, be an aliphatic ring wherein fluorine atom(s) or a substituent containing fluorine atom(s) is bonded to a carbon atom constituting the ring structure of the aliphatic ring. The substituent containing fluorine atom(s) may, for example, be a perfluoroalkyl group, a perfluoroalkoxy group or a difluoromethylidene group ($=CF_2$).

Further, the aliphatic ring may have a substituent other than the substituent containing fluorine atom(s).

The fluorinated polymer having an aliphatic ring in its main chain may, for example, be the following polymer (I) or polymer (II). These fluorinated polymers are preferably perfluoro-fluorinated polymers.

Polymer (I): a polymer having units based on a cyclic fluorinated monomer.

Polymer (II): a polymer having units formed by cyclopolymerization of a diene type fluorinated monomer.

Polymer (I) has units based on a cyclic fluorinated monomer. The "cyclic fluorinated monomer" is a monomer having a polymerizable double bond between carbon atoms constituting the aliphatic ring, or a monomer having a polymerizable double bond between a carbon atom constituting the aliphatic ring and a carbon atom outside the aliphatic ring.

The cyclic fluorinated monomer is preferably the following compound (1) or compound (2). Compound (1) and compound (2) are perfluoro-compounds, i.e. compounds having no hydrogen atoms bonded to carbon atoms.

(1)

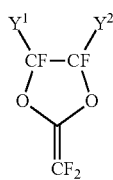
(2)

[In the formulae, each of $X^1$, $X^2$, $X^3$, $X^4$, $Y^1$ and $Y^2$ which are independent of one another, is a fluorine atom, a perfluoroalkyl group which may have an oxygen atom interposed, or a perfluoroalkoxy group which may have an oxygen atom interposed. Or, $X^3$ and $X^4$ may be bonded to each other to form a perfluoroalkylene group which may have an etheric oxygen atom.]

The perfluoroalkyl group for $X^1$, $X^2$, $X^3$, $X^4$, $Y^1$ and $Y^2$ has preferably from 1 to 7 carbon atoms, particularly preferably from 1 to 4 carbon atoms. Such a perfluoroalkyl group is preferably linear or branched, particularly preferably linear. Specifically, a trifluoromethyl group, a pentafluoroethyl group, a heptafluoropropyl group, etc. may be mentioned, and a trifluoromethyl group is particularly preferred.

The perfluoroalkoxy group for $X^1$, $X^2$, $X^3$, $X^4$, $Y^1$ and $Y^2$ may be one having an oxygen atom (—O—) bonded to the above perfluoroalkyl group, and a trifluoromethoxy group is particularly preferred.

In a case where the above perfluoroalkyl group or perfluoroalkoxy group has at least two carbon atoms, it may have an etheric oxygen atom (—O—) between carbon atoms in the perfluoroalkyl group or perfluoroalkoxy group.

In the formula (1), $X^1$ is preferably a fluorine atom. $X^2$ is preferably a fluorine atom, a trifluoromethyl group or a $C_{1-4}$ perfluoroalkoxy group, particularly preferably a fluorine atom or a trifluoromethoxy group. Each of $X^3$ and $X^4$ which are independent of each other, is preferably a fluorine atom or a $C_{1-4}$ perfluoroalkyl group, particularly preferably a fluorine atom or a trifluoromethyl group.

In a case where $X^3$ and $X^4$ are bonded to each other to form a perfluoroalkylene group which may have an etheric oxygen atom, the number of atoms constituting the ring structure of the ring formed by one carbon atom, $X^3$ and $X^4$, is preferably from 4 to 7, particularly preferably 5 or 6.

Compound (1-1) to (1-5) may be mentioned as preferred specific examples of compound (1).

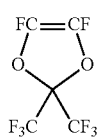
(1-1)

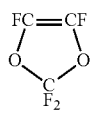
(1-2)

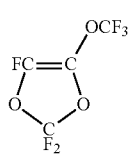
(1-3)

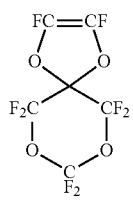
(1-4)

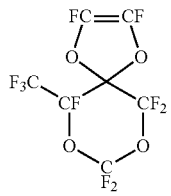
(1-5)

In the formula (2), each of $Y^1$ and $Y^2$ which are independent of each other, is preferably a fluorine atom, a $C_{1-4}$ perfluoroalkyl group or a $C_{1-4}$ perfluoroalkoxy group, particularly preferably a fluorine atom or a trifluoromethyl group.

Compounds (2-1) and (2-2) may be mentioned as preferred specific examples of compound (2).

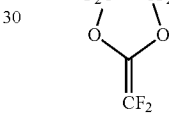
(2-1)

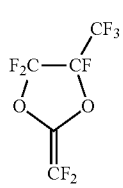
(2-2)

Each of compound (1) and compound (2) has one polymerizable double bond, and two carbon atoms in such a polymerizable double bond become carbon atoms constituting the main chain of the polymer. In the case of compound (1), two carbon atoms constituting its double bond are simultaneously carbon atoms constituting the aliphatic ring, and therefore, the two carbon atoms among carbon atoms constituting the aliphatic ring become carbon atoms constituting the main chain. Whereas, in the case of compound (2), one of the two carbon atoms constituting its double bond is a carbon atom constituting the aliphatic ring, and therefore, one carbon atom among carbon atoms constituting the aliphatic ring becomes a carbon atom constituting the main chain.

Polymer (I) may be composed solely of units formed by the above cyclic fluorinated monomer, or may be a copolymer having such units and other units. However, in such polymer (I), the proportion of units based on the cyclic fluorinated monomer is preferably at least 20 mol %, particularly preferably at least 40 mol %, or may be 100 mol %, to the total of all units constituting such polymer (I).

Such another monomer is not particularly limited, so long as it is copolymerizable with the above cyclic fluorinated monomer. Specifically, a diene type fluorinated monomer, tetrafluoroethylene, chlorotrifluoroethylene, a perfluoro(m- ethyl vinyl ether), etc. may be mentioned. The diene type fluorinated monomer may be the same as one which will be mentioned in the following description of polymer (II).

Another monomer is preferably a perfluoro-monomer i.e. a fluorinated monomer containing no hydrogen atoms bonded to carbon atoms. Particularly preferred is a perfluorodiene type fluorinated monomer which will be described later, or tetrafluoroethylene.

Here, a polymer obtainable by copolymerization of the cyclic fluorinated monomer and the diene type fluorinated monomer is regarded as polymer (I).

Polymer (II) has units formed by cyclopolymerization of a diene type fluorinated monomer.

The "diene type fluorinated monomer" is a monomer having two polymerizable double bonds and fluorine atoms. Such polymerizable double bonds are not particularly limited, but preferably are polymerizable double bonds in a vinyl group, an allyl group, a 3-butenyl group, an acryloyl group or a methacryloyl group.

The diene type fluorinated monomer is preferably a perfluorodiene type fluorinated monomer i.e. a diene type fluorinated monomer containing no hydrogen atoms bonded to carbon atoms.

The following compound (3) is preferred as the perfluorodiene type fluorinated monomer.

$$CF_2=CF-Q-CF=CF_2 \quad (3)$$

In the formula (3), Q is a $C_{1-5}$, preferably $C_{1-3}$, perfluoroalkylene group, which may have a branch, may have an etheric oxygen atom and may have some of fluorine atoms substituted by halogen atoms other than fluorine atoms. The halogen atoms other than fluorine atoms may, for example, be chlorine atoms or bromine atoms.

Q is preferably a perfluoroalkylene group having an etheric oxygen atom. In such a case, the etheric oxygen atom in the perfluoroalkylene group may be present at one terminal of the group, at each terminal of the group, or between carbon atoms of the group. From the viewpoint of the cyclopolymerizability, it is preferably present at one terminal of the group.

The following compounds may be mentioned as specific examples of compound (3).

$CF_2=CFOCF_2CF=CF_2$, $CF_2=CFOCF(CF_3)CF=CF_2$, $CF_2=CFOCF_2CF_2CF=CF_2$, $CF_2=CFOCF_2CF(CF_3)CF=CF_2$, $CF_2=CFOCF(CF_3)CF_2CF=CF_2$, $CF_2=CFOCFClCF_2CF=CF_2$, $CF_2=CFOCCl_2CF_2CF=CF_2$, $CF_2=CFOCF_2OCF=CF_2$, $CF_2=CFOC(CF_3)_2OCF=CF_2$, $CF_2=CFOCF_2CF(OCF_3)CF=CF_2$, $CF_2=CFCF_2CF=CF_2$, $CF_2=CFCF_2CF_2CF=CF_2$, $CF_2=CFCF_2OCF_2CF=CF_2$

The following units (3-1) to (3-4), etc. may be mentioned as units to be formed by cyclopolymerization of compound (3).

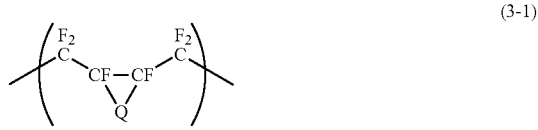
(3-1)

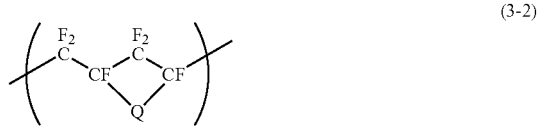
(3-2)

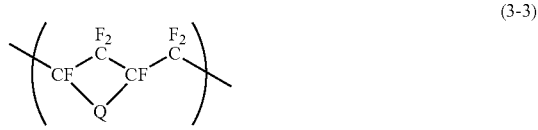
(3-3)

(3-4)

Compound (3) has two polymerizable double bonds, and among the total of four carbon atoms of such double bonds, four or two become carbon atoms constituting the main chain, and among the four carbon atoms, from two to four form, together with Q, an aliphatic ring. Among the above units (3-1) to (3-4), units (3-1) to (3-3) show that four among the four carbon atoms in the double bonds become carbon atoms constituting the main chain, and unit (3-4) shows that two among the four carbon atoms in the double bonds become carbon atoms constituting the main chain. Further, in the case of unit (3-1), two carbon atoms and Q form an aliphatic ring; in the case of unit (3-2) and unit (3-3), three carbon atoms and Q form an aliphatic ring; and in the case of unit (3-4), four carbon atoms and Q form an aliphatic ring.

The number average molecular weight (Mn) of the fluorinated polymer in the present invention is preferably from 3,000 to 300,000, particularly preferably from 5,000 to 200,000. When Mn is at least the lower limit value in the above range, the fluorinated polymer is less likely to be brittle, and when it is at most the upper limit value, the fluorinated polymer is excellent in solubility in a solvent and moldability.

In the production of the fluorinated polymer in the present invention, it is preferred to use a polymerization initiator. A chain transfer agent may be used in combination, whereby the molecular weight may be controlled.

The polymerization initiator is not particularly limited, and a known compound may be used. It may, for example, be an azo compound, such as 2,2'-azobis(N,N'-dimethyleneisobutylamidine)dihydrochloride, 2,2'-azobis(2-amidinopropane)dihydrochloride, 2,2'-azobis(N,N'-dimethyleneisobutylamidine), 4,4'-azobis(4-cyanopentanoic acid), 2,2'-azobis{2-methyl-N-[1,1-bis(hydroxymethyl)-2-hydroxyethyl]propioneamide}, 2,2'-azobis{2-methyl-N-[1,1-bis(hydroxymethyl)ethyl]propioneamide}, 2,2'-azobis{2-methyl-N-(2-hydroxyethyl)propioneamide}, 2,2'-azobis(isobutylamide)dihydrate, 2,2'-azobis(4-methoxy-2,4-dimethylvaleronitrile), 2,2'-azobis(2,4-dimethylvaleronitrile), (1-phenylethyl)azodiphenylmethane, 2,2'-azobisisobutyronitrile, dimethyl 2,2'-azobisisobutyrate, 2,2'-azobis(2-methylbutyronitrile), 1,1'-azobis(1-cyclohexanecarbonitrile), 2-(carbamoylazo)-isobutyronitrile, 2,2'-azobis(2,4,4-trimethylpentane), 2-phenylazo-2,4-dimethyl-4-methoxyvaleronitrile, or 2,2'-azobis(2-methylpropane); an organic peroxide, such as bisstearoyl peroxide, diisopropyl peroxy dicarbonate, benzoyl peroxide, 2,4-dichlorobenzoyl peroxide, diacetyl peroxide, t-butyl hydroperoxide, cumene hydroperoxide, diisopropylbenzene hydroperoxide, p-menthane hydroperoxide, 2,5-dimethylhexane-2,5-dihydroperoxide, methyl ethyl ketone peroxide, cyclohexanone peroxide, di-t-butyl peroxide, dicumyl peroxide, t-butylcumyl peroxide, 2,5-dimethyl-2,5-di(t-butyl peroxy)hexane, 2,5-dimethyl-2,5-di(t-butyl peroxy)hexyne-3, dioctanoyl peroxide, didecanoyl peroxide, dilauroyl peroxide, t-butyl peroxybenzoate, t-butyl peroxyacetate, t-butyl peroxypivalate, t-butyl peroxyisobutyrate, t-butyl peroxyisopropyl carbonate, di-t-butyl diperoxyphthalate, t-butyl peroxylaurate, 2,5-dimethyl-2,5-di(benzoyl peroxy)hexane, di-perfluorobutanoic peroxide, di-perfluoro-3-oxa-2-methylhexanoic peroxide, or di-perfluoronanoic peroxide; or an inorganic peroxide, such as $K_2S_2O_8$, or $(NH_4)_2S_2O_8$.

The chain transfer agent is not particularly limited, and a known compound may be used. It may, for example, be an alcohol such as methanol, ethanol, propanol or butanol, or a cycloalkane such as cyclohexane.

In the present invention, unstable terminal groups in the fluorinated polymer may be residues derived from a polymerization initiator, a chain transfer agent, a dispersion stabilizer, a monomer, etc. used at the time of producing the fluorinated polymer by polymerizing a monomer. Particularly, groups derived from at least one member selected from the group consisting of a polymerization initiator, a chain transfer agent and a dispersion stabilizer, are likely to be unstable terminal groups.

The unstable terminal group may, for example, be a functional group having active hydrogen, such as a hydroxy group, an amino group, a carboxy group or a sulfo group; a group derived from a carboxylic acid, such as a carboxylic acid halide, a carboxylic acid amide or a carboxylic acid ester; a carbonate group; a group derived from a sulfonic acid, such as a sulfonic acid halide, a sulfonic acid amide or a sulfonic acid ester; a hydrocarbon group, or hydrogen. For example, $(CH_3)_2CHOC(=O)O$-derived from diisopropyl peroxydicarbonate as a polymerization initiator, $HO-CH_2-$ derived from methanol as a chain transfer agent, or hydrogen derived from a fluorinated monomer, may be exemplified. The dispersion stabilizer is a compound to be used for stabilizing the dispersibility when the polymerization is conducted by suspension polymerization.

If the fluorinated polymer has such unstable terminal groups, at the time of molding the fluorinated polymer or during its use at a high temperature, such unstable terminal groups are likely to be decomposed to corrode the apparatus or to color the fluorinated polymer itself.

[Terminal Group Conversion Method]

The terminal group conversion method of the present invention is a method for converting the above-mentioned unstable terminal groups in the fluorinated polymer to carboxylic acid fluoride groups.

In the terminal group conversion method of the present invention, heating is conducted while contacting molecular oxygen to the fluorinated polymer in the presence of at least 50 mol of molecular oxygen per 1 mol of the unstable terminal groups in the fluorinated polymer. Here, the temperature for such heating is from 200 to 400° C., and the heating time is at least one hour.

The heating temperature is preferably from 250 to 380° C., particularly preferably from 250 to 350° C. When the heating temperature is at least the lower limit value in the above range, a high conversion rate is obtainable. Further, the light transmittance of the obtainable fluorinated polymer can be made high. When the heating temperature is at most the upper limit value in the above range, such is preferred in that the fluorinated polymer is less likely to be decomposed at its main chain.

The heating time is preferably from 1 to 24 hours, particularly preferably from 1 to 20 hours. When the heating time is at least the lower limit value in the above range, a high conversion rate is obtainable, and when it is at most the upper limit value in the above range, such is excellent in that the fluorinated polymer is less likely to be decomposed at its main chain, and the production cost is less likely to be so high.

The heating is conducted in the presence of at least 50 mol of molecular oxygen per 1 mol of unstable terminal groups in the fluorinated polymer. The molecular oxygen is preferably from 50 to 800 mol, particularly preferably from 50 to 500 mol, per 1 mol of the unstable terminal groups. When it is at least the lower limit value in the above range, a high conversion rate is obtainable, and when it is at most the upper limit value in the above range, such is excellent in that the production cost is less likely to be so high.

As the molecular oxygen, oxygen gas may be used, or air may be used. When the molecular oxygen is within the above range, a gas other than the molecular oxygen may be any gas, so long as it is a gas whereby the fluorinated polymer will not be decomposed. From the viewpoint of inexpensiveness and safety, an inert gas such as nitrogen, or air, is preferred.

The above heating is preferably conducted, for example, by a heating furnace such as an electric oven. The gas in the heating furnace may be circulated or may not be circulated. Further, a gas containing fresh molecular oxygen may be supplied from outside. Or, a gas containing fresh molecular oxygen may be supplied while circulating the gas in the heating furnace.

An example of the apparatus to supply a gas containing fresh molecular oxygen while circulating the gas in the heating furnace, is shown in the FIGURE. In the FIGURE, the heating furnace 10 is provided with a fan 12 to supply air into the furnace, a heater 14 to heat air which is circulated by the fan 12, and shelves 18 to mount containers 16 to accommodate the fluorinated polymer to be treated. Further, the heating furnace 10 is preferably constructed to have a suction damper 20 and an exhaust damper 22 in order to carry out circulation of air while supplying air afresh from outside of the heating furnace 10. The amount of air to be supplied into the heating furnace 10 can be controlled by suitably adjusting the opening degrees of the suction damper 20 and the exhaust damper 22, but the amount of air to be supplied may be controlled by using a flow meter not shown. In order to let unstable terminal groups of the fluorinated polymer in the heating furnace be uniformly converted, the temperature in the heating furnace is preferably uniform, and it is more preferred to let the gas containing molecular oxygen be circulated by e.g. a fan. Further, a baffle plate may be provided in the heating furnace 10 to forcibly create a stream of air, or air may be stirred by a stirring device.

For heating the fluorinated polymer in the above heating furnace 10, there is a method (hereinafter referred to also as "no air supply treatment") of heating only by air (molecular oxygen) present in the heating furnace 10 at the initiation of heating in such a state that the suction damper 20 and the exhaust damper 22 are closed i.e. without supplying air from outside into the heating furnace 10, or a method (hereinafter referred to also as "air supply treatment") of heating while supplying air from outside of the heating furnace 10 into the heating furnace 10 by suitably opening the suction damper 20 and the exhaust damper 22.

When the above no air supply treatment and air supply treatment are compared, in the no air supply treatment, it is necessary to enlarge the size of the heating furnace or to reduce the treating amount of the fluorinated polymer per one operation, since during the heating, it is necessary to let molecular oxygen be present in an amount of at least 50 times in molar ratio to the unstable terminal groups in the fluorinated polymer. Whereas, in the air supply treatment, molecular oxygen to be supplied during the heating may be adjusted to be at least 50 times in molar ratio to the unstable terminal groups in the fluorinated polymer, and therefore, the heating furnace 10 may be small-sized, such being preferred.

In the case of the no air supply treatment, the capacity of the heating furnace 10 and the amount of the fluorinated polymer to be treated, are adjusted so that the amount of molecular oxygen in air preliminarily present in the heating furnace 10 would be at least 50 mol per 1 mol of unstable terminal groups. Whereas, in the case of the air supply treatment, the capacity of the heating furnace 10, the amount of the fluorinated polymer to be treated, and the supplying amount of air, are adjusted so that the total amount of molecular oxygen in air preliminarily present in the heating furnace 10 before heating and molecular oxygen in air to be supplied during heating, would be at least 50 mol per 1 mol of unstable terminal groups. Here, it is preferred to supply air at a rate of from 5 to 300 mol/hr to 1 mol of unstable terminal groups.

The material for the container 16 is not particularly limited, so long as it is durable at the heating temperature. For example, aluminum, nickel, stainless steel, etc. may be mentioned. The shape of the container 16 is not particularly limited, but it is preferred that the opening is wide so that the content will be efficiently in contact with molecular oxygen. Further, the thickness of the fluorinated polymer put in the container 16 is preferably from 1 to 2 mm, so that it will be efficiently in contact with molecular oxygen.

[Terminal Stabilizing Method]

The terminal stabilizing method of the present invention is a method which comprises converting from 50 to 100 mol % of unstable terminal groups in a fluorinated polymer obtained by polymerization to carboxylic acid fluoride groups by the above-mentioned terminal group conversion method, and then reacting molecular fluorine to convert the carboxylic acid fluoride groups to perfluoromethyl groups. As mentioned above, by the terminal group conversion method of the present invention, it is possible to convert unstable terminal groups in the fluorinated polymer to carboxylic acid fluoride groups at a high conversion rate, and it is possible to convert the carboxylic acid fluoride groups to perfluoromethyl groups at a high conversion rate, whereby, as a result, it is possible to convert unstable terminal groups in the fluorinated polymer to perfluoromethyl groups at a high conversion rate.

The method of reacting the carboxylic acid fluoride groups in the fluorinated polymer with molecular fluorine to convert them to perfluoromethyl groups is preferably a method of dissolving fluorine gas in a solution having the fluorinated polymer having the carboxylic acid fluoride groups dissolved, and reacting molecular fluorine to the carboxylic acid fluoride groups in the solution to convert the carboxylic acid fluoride groups to perfluoromethyl groups. Otherwise, a solution of the fluorinated polymer having the carboxylic acid fluoride groups (hereinafter referred to also as a "fluorinated polymer solution") and a solution of molecular fluorine having fluorine gas dissolved in a solvent, may be mixed to likewise carry out the reaction. As the solvent to be used for this reaction, a solvent which has a high solubility of the fluorinated polymer and which is inert to molecular fluorine, is used, and a fluorinated solvent having no hydrogen atoms bonded to carbon atoms, such as a perfluorotrialkylamine, is preferred.

The reaction of the fluorinated polymer and molecular fluorine dissolved in a fluorinated solvent is an exothermic reaction, and further, molecular fluorine has a high activity against the material of containers to be used for the reaction. Accordingly, the fluorine gas is preferably used as diluted by an inert gas such as nitrogen gas. If the fluorine gas concentration is too low, the production efficiency decreases, and therefore, the proportion of fluorine gas in a mixed gas of fluorine gas and an inert gas is preferably from 0.1 to 20 mol %, particularly preferably from 0.5 to 5 mol %.

If the concentration of the fluorinated polymer in the fluorinated polymer solution is too high, the viscosity of the solution tends to be high, the uniformity in the reaction efficiency tends to be low, and heat removal tends to be difficult so that an abnormal reaction is likely to occur, and if the concentration is too low, the production efficiency decreases. Accordingly, the fluorinated polymer concentration is preferably from 1 to 20 mass %, particularly preferably form 5 to 15 mass %.

The proportion of fluorine gas to be supplied to 1 g of the fluorinated polymer is usually preferably from 10 to 100 mL in a standard state. The fluorine gas may be supplied batch-wise or continuously. The reaction pressure is optional, but is preferably from ordinary pressure to 2 MPaG. The reaction temperature is usually from 100 to 300° C., but in consideration of practical treating time, at least 170° C. is preferred, and in consideration of the pressure resistance of containers and safety, at most 230° C. is preferred. The reaction time tends to be long when the reaction temperature is low and tends to be short when the reaction temperature is high. In a case where the reaction temperature is from 170 to 230° C., the reaction time is suitably from 10 to 100 hours.

The carboxylic acid fluoride groups can be converted to a carboxylic acid when reacted with water, while they can be converted to methyl ester groups when reacted with methanol. From such methyl ester groups, by an ester exchange reaction or the like, various functional groups may be introduced to terminals of the fluorinated polymer. As unstable terminal groups in the fluorinated polymer can be converted to carboxylic acid fluoride groups at a high conversion rate, it is possible to convert the terminals to various terminal groups at a high conversion rate.

EXAMPLES

Now, the present invention will be described with reference to Examples, but it should be understood that the present invention is by no means restricted by these Examples. Ex. 1 to 5, 8 and 11 are Examples of the present invention, and Ex. 6, 7, 9 and 10 are Comparative Examples.

In Examples and Comparative Examples, the method for producing a fluorinated polymer, the heating method and the method for measuring the amount of terminal groups were conducted as follows.

[Measurement of Terminal Group Concentration of Fluorinated Polymer]

(1) Method for Measuring Unstable Terminal Group Concentration of Fluorinated Polymer Before Heating by Terminal Group Conversion Method of the Present Invention The unstable terminal group concentration before heating was obtained by $^1$H-NMR. The fluorinated polymer and p-hexafluoroxylene as a standard substance were dissolved at a ratio of 100:1 (mass ratio) in perfluorobenzene to obtain a sample for measurement. The concentration (mol/g) of each unstable terminal group was obtained from the ratio of the area of the peak derived from each unstable terminal group (CH of an isopropyl group being in the vicinity of 5 ppm, $CH_2$ in HO—$CH_2$— being in the vicinity of 4.3 ppm, H in $CF_2$—H— being in the vicinity of 6.5 ppm, etc.) to the area of the peak derived from p-hexafluoroxylene, and the total of such concentrations was obtained as the terminal group concentration before heating.

(2) Method for Measuring Carboxylic Acid Fluoride Group (—COF) Concentration after Heating by Terminal Group Conversion Method of the Present Invention Using "Nicolet iS10 FT-IR" manufactured by Thermo Fisher Scientific Inc., the infrared absorption spectrum of a compression molded film (thickness: 200 μm) of the fluorinated polymer was measured. The absorbance at 1,883 cm$^{-1}$ was obtained, and the functional group concentration (mol/g) of carboxylic acid fluoride groups was calculated by the Lambert-Beer formula.

Carboxylic acid fluoride group concentration (mol/g)= Absorbance×Correction coefficient (mol×mm/g)/ Thickness of compression molded film (mm)

The correction coefficient was obtained from the infrared absorption spectrum of a compound, of which the carboxylic acid fluoride concentration was known, and was 9×10$^{-6}$ (mol×mm/g).

(3) Method for Calculating Carboxylic Acid Fluoride Group Conversion Rate (%)

Calculated from the above (carboxylic acid fluoride group concentration after heating)/(unstable terminal group concentration before heating).

[Measurement of Light Transmittance]

Using an ultraviolet-visible near infrared spectrophotometer UV3100PC (manufactured by Shimadzu Corporation), the transmittance of a compression molded film (thickness: 200 μm) of the fluorinated polymer was measured within a range of a wavelength of from 200 to 800 nm, and the transparency was evaluated by the transmittance at a wavelength of 300 nm.

Preparation Example 1

Into a glass lined reactor having an internal capacity of 300 L, 135 kg of perfluoro(3-butenyl vinyl ether), 180 kg of ion-exchanged water, 5.1 kg of a dispersion stabilizer (trade name: Newcol 714SN manufactured by Nippon Nyukazai Co., Ltd.), 15.7 kg of methanol as a chain transfer agent, and 0.3 kg of diisopropylperoxy dicarbonate as a polymerization initiator, were put. After substituting inside of the system by nitrogen, suspension polymerization was conducted at 40° C. for 20 hours and at 50° C. for 6 hours to obtain fluorinated polymer A. Then, particles of obtained fluorinated polymer A were recovered by filtration, washed with methanol and water, and then dried at 100° C., to obtain 125 kg of fluorinated polymer A having terminal groups derived from perfluoro(3-butenyl vinyl ether) and methanol (number average molecular weight (Mn): 45,000, mass average molecular weight (Mw): 100,000, the measurement of the average molecular weight was conducted by GPC (gel permeation chromatography) as calculated as PMMA.).

Ex. 1

In an oven (heating furnace) having an internal capacity of 630 L, 15 kg of fluorinated polymer A was heated at 345° C. for 10 hours while supplying air at a rate of 900 L/hr (air supply treatment) to obtain fluorinated polymer (B-1). The infrared absorption spectrum of a compression molded film (thickness: 200 μm) of fluorinated polymer (B-1) was measured, whereby an absorption peak attributable to carboxylic acid fluoride groups was confirmed at 1,883 cm$^{-1}$. Further, the transmittance at a wavelength of 300 nm of the same film was measured and found to be as high as 91%. Various conditions and evaluation results are shown in Table 1. Here, in Table 1, "oxygen amount" in Ex. 1 is the sum of the oxygen amount in air present before heating in the oven and the oxygen amount in air which was supplied. Further, "unstable terminal group concentration before heating" is the concentration of unstable terminal groups. Further, "carboxylic acid fluoride group conversion rate" is the proportion of unstable terminal groups converted to carboxylic acid fluoride groups and was obtained by the above-mentioned method.

Ex. 2 to 4

Fluorinated polymers (B-2) to (B-4) were obtained in the same manner as in Ex.1 except that the amount of air supplied ("air supply amount") was changed to the values shown in Table 1. Using fluorinated polymers (B-2) to (B-4) instead of fluorinated polymer (B-1), compression molded films were prepared, and the infrared absorption spectra and the transmittances at a wavelength of 300 nm were measured. Various conditions and evaluation results are shown in Table 1.

Ex. 5

In an oven having an internal capacity of 630 L, 1.5 kg of fluorinated polymer A was heated at 300° C. for 10 hours (no air supply treatment) to obtain fluorinated polymer (B-5). A compression molded film was prepared in the same manner as in Ex. 1 except that fluorinated polymer (B-5) was used instead of fluorinated polymer (B-1), and the infrared absorption spectrum and the transmittance at a wavelength of 300 nm were measured. Various conditions and evaluation results are shown in Table 1. Here, in Table 1, "oxygen amount" in Ex. 5 is the oxygen amount in air present before heating in the oven.

Ex. 6

Fluorinated polymer (B-6) was obtained in the same manner as in Ex. 5 except that the mass of fluorinated polymer A was changed to 15 kg, and the heating temperature was changed to 345° C. A compression molded film was prepared in the same manner as in Ex. 5 except that fluorinated polymer (B-6) was used instead of fluorinated polymer (B-5), and the infrared absorption spectrum and the transmittance at a wavelength of 300 nm were measured. Evaluation results are shown in Table 1.

Ex. 7

In the same oven as in Ex. 5, 15 kg of fluorinated polymer A was heated at 320° C. for 0.83 hour (no air supply treatment) to obtain fluorinated polymer (B-7). A compression molded film was prepared in the same manner as in Ex. 5 except that fluorinated polymer (B-7) was used instead of fluorinated polymer (B-5), and the infrared absorption spectrum and the transmittance at a wavelength of 300 nm were measured. Various conditions and evaluation results are shown in Table 1.

Ex. 8

A 2 L autoclave made of nickel was depressurized to −760 Torr, and then, 2,150 g of a solution prepared by dissolving fluorinated polymer (B-1) obtained in Ex. 1 in perfluorotributylamine (PTBA) and adjusting the concentration to 9 mass %, was charged under reduced pressure. Then, treatment of introducing fluorine gas diluted to a concentration of 2% with nitrogen gas up to 0.8 MPaG into the autoclave, followed by stirring at 195° C. for 10 hours, was conducted twice, to obtain fluorinated polymer (C-1). The infrared absorption spectrum of a compression molded film (thickness: 200 μm) of fluorinated polymer (C-1) was measured, whereby no characteristic absorption at 1,883 $cm^{-1}$ attributable to carboxylic acid fluoride groups was observed. That is, it was confirmed that 100 mol % of carboxylic acid fluoride groups in fluorinated polymer (B-1) was converted to perfluoromethyl groups.

Ex. 9

Fluorinated polymer (C-2) was obtained by conducting a fluorination reaction in the same manner as in Ex. 8 except that fluorinated polymer (B-1) was changed to fluorinated polymer A obtained in Preparation Example 1. Fluorinated polymer (C-2) and p-hexafluoroxylene as a standard substance were dissolved in a ratio of 100:1 (mass ratio) in perfluorobenzene, and H-NMR was measured, whereupon the remaining unstable terminal group amount was calculated. As a result, it was confirmed that only 20 mol % of unstable terminal groups in fluorinated polymer A was converted to perfluoromethyl groups.

Ex. 10 and 11

Fluorinated polymers (B-10) and (B-11) were obtained in the same manner as in Ex. 5 except that the mass of fluorinated polymer A was changed to 15 kg, and the heating temperature was changed to 180° C. and 250° C., respectively. Compression molded films were prepared in the same manner as in Ex. 5 except that fluorinated polymers (B-10) and (B-11) were used instead of fluorinated polymer (B-5) and the infrared absorption spectra and the transmittances at a wavelength of 300 nm were measured. Various conditions and evaluation results are shown in Table 1.

TABLE 1

|  | Ex. 1 | Ex. 2 | Ex. 3 | Ex. 4 | Ex. 5 | Ex. 6 | Ex. 7 | Ex. 10 | Ex. 11 |
|---|---|---|---|---|---|---|---|---|---|
| Heating temperature (° C.) | 345 | 345 | 345 | 345 | 300 | 345 | 320 | 180 | 250 |
| Heating time (hr) | 10 | 10 | 10 | 10 | 10 | 10 | 0.83 | 10 | 10 |
| Air supply amount (L/hr) | 900 | 1,800 | 2,400 | 260 | 0 | 0 | 0 | 0 | 0 |
| Molecular oxygen amount (mol) | 80 | 150 | 200 | 22 | 5 | 5 | 5 | 5 | 5 |
| Unstable terminal group concentration before heating (×$10^5$ mol/g) | 2.7 | 2.7 | 2.7 | 2.7 | 2.7 | 2.7 | 2.7 | 2.7 | 2.7 |
| Mol ratio of molecular oxygen to 1 mol of unstable terminal groups | 198 | 370 | 494 | 54 | 123 | 12 | 12 | 54 | 54 |
| Carboxylic acid fluoride group conversion rate (%) | 81 | 96 | 100 | 62 | 74 | 41 | 19 | 0 | 51 |
| Light transmittance (%) | 92 | 93 | 93 | 92 | 90 | 86 | 83 | 80 | 88 |

In Ex. 1 to 5 and 11 employing the terminal group conversion method of the present invention, the carboxylic acid fluoride group conversion rate was from 50 to 100%.

On the other hand, in Ex. 6 and 7 wherein molecular oxygen was less than 50 mol per 1 mol of unstable terminal groups in the fluorinated polymer, the carboxylic acid fluoride group conversion rate was less than 50%. Further, in Ex. 7, in addition to deficiency of molecular oxygen, the heating time was short at a level of less than one hour, whereby the carboxylic acid fluoride group conversion rate was the lowest.

In Ex. 8 employing the terminal stabilizing method of the present invention, it was possible to stabilize unstable terminal groups in the fluorinated polymer obtained by polymerization, at a high conversion rate.

On the other hand, in Ex. 9 not employing the terminal stabilizing method of the present invention, stabilization of unstable terminal groups in the fluorinated polymer obtained by polymerization, was inadequate.

In Ex. 10 wherein the reaction was conducted at 180° C., stabilization of unstable terminal groups in the fluorinated polymer obtained by polymerization, did not proceed at all, even if molecular oxygen was at least 50 mol per 1 mol of unstable terminal groups in the fluorinated polymer.

In a case where a fluorinated polymer is to be used as an optical material, it is preferred that its light transmittance is high. If its transmittance at a wavelength of 300 nm is less than 88%, it looks as colored, and therefore, the transmittance is preferably at least 88%. The transmittance of the fluorinated polymer obtained in each of Ex. 1 to 5 and 11, was at least 88%, thus being useful as an optical material.

INDUSTRIAL APPLICABILITY

Applications of the fluorinated polymer of the present invention may, for example, be for optical waveguide material, core/clad material for optical fibers, wire coating material, an ink repellent (e.g. for coating, or a printing machine such as an ink jet), an oil repellent (e.g. oil-preventive coating of a filter, a high performance oil repellent such as an oil-leakage preventing agent for a fluid dynamic bearing motor, or antifouling coating), a lubricant, lens material, LED sealing material, an adhesive for a semiconductor element (e.g. LOC (Lead on Chip), an adhesive for a tape, an adhesive for die bonding, or an adhesive for fixing a pellicle), a protective coating for a semiconductor (e.g. a buffer coating film, a passivation film, a semiconductor element α-ray shielding film, or a moisture-proof coating agent), an interlayer dielectric film (e.g. for a semiconductor element, for a liquid crystal display, or for a multilayer printed circuit board), coating to prevent adhesion of biological material such as proteins, a gas selective separation film, etc.

This application is a continuation of PCT Application No. PCT/JP2014/057864, filed on Mar. 20, 2014, which is based upon and claims the benefit of priority from Japanese Patent Application No. 2013-066015 filed on Mar. 27, 2013. The contents of those applications are incorporated herein by reference in their entireties.

REFERENCE SYMBOLS

10: heating furnace, 12: fan, 14: heater, 16: containers, 18: shelves, 20: suction damper, 22: exhaust damper

What is claimed is:

1. A method to prepare a fluorinated polymer having perfluoromethyl terminal groups, comprising:

heating a fluorinated polymer at from 200 to 400° C. for at least one hour in the presence of molecular oxygen to convert from 50 to 100 mol % of terminal groups comprising units of a polymerization initiator, a chain transfer agent or a dispersion stabilizer to carboxylic acid fluoride groups (—COF); and reacting molecular fluorine with the fluorinated polymer comprising the carboxylic acid fluoride groups to convert the carboxylic acid fluoride groups to perfluoromethyl groups;

wherein in the reaction of molecular fluorine with the fluorinated polymer comprising the carboxylic acid fluoride groups the fluorine gas is dissolved and reacted in a solution of the fluorinated polymer having the carboxylic acid fluoride groups, and a mol ratio of molecular oxygen to terminal groups comprising units of a polymerization initiator, a chain transfer agent or a dispersion stabilizer is at least 50/1.

2. The method according to claim 1, wherein the molecular oxygen is supplied at a rate of from 5 to 300 mol/hr to the fluorinated polymer.

3. The method according to claim 1, wherein a content of the fluorinated polymer having carboxylic acid fluoride groups in the solvent is from 1 to 20 mass %.

4. The method according to claim 1, wherein the fluorinated polymer comprises an aliphatic ring in its main chain.

5. The method according to claim 1, wherein the fluorinated polymer is a perfluoro-fluorinated polymer.

6. The method according to claim 1, wherein a temperature of the reaction of molecular fluorine with the fluorinated polymer comprising the carboxylic acid fluoride groups is from 100 to 300° C.

7. The method according to claim 1, wherein the solvent for the reaction of molecular fluorine with the fluorinated polymer comprising the carboxylic acid fluoride groups is a fluorinated compound having no H atoms bonded to carbon.

8. The method according to claim 7 wherein the solvent is a perfluorotrialkylamine.

* * * * *